F. R. SOMMERMEYER.
SYNCHRONIZING MECHANISM.
APPLICATION FILED MAY 2, 1918.

1,391,423.

Patented Sept. 20, 1921.

Inventor
FRANK R. SOMMERMEYER

Witness
R. M. Wiemer

By Charles E. Wiemer
Attorney

UNITED STATES PATENT OFFICE.

FRANK R. SOMMERMEYER, OF SPRING LAKE, MICHIGAN.

SYNCHRONIZING MECHANISM.

1,391,423.  Specification of Letters Patent.  Patented Sept. 20, 1921.

Application filed May 2, 1918. Serial No. 232,003.

*To all whom it may concern:*

Be it known that I, FRANK R. SOMMERMEYER, a citizen of the United States, residing at Spring Lake, county of Ottawa, State of Michigan, have invented a certain new and useful Improvement in Synchronizing Mechanism, and declare the following to be a full, clear, and exact description of the same, such as will enable others skilled in the art to which it pertains to make and use the same, reference being had to the accompanying drawings, which form a part of this specification.

This invention relates to synchronizing mechanism particularly adapted for operating stage effect producing devices in timed relation with scenes displayed by a moving picture film. In my pending application Serial No. 113,397, filed Aug. 5, 1916, is disclosed various types of devices for producing various visible and audible stage effects to be operated in timed relation with a scene displayed by a moving picture machine, which effect producing devices are controlled by a perforated master strip operating over a tracker board, and in order that the various effect producing devices may be operated at the time the corresponding scene is displayed on the screen it is necessary that the movement of the strip across the tracker board be maintained in exact time relation with the movement of the film through the moving picture apparatus. To this end therefore the primary object of the invention is a device by means of which the strip may be operated and advanced or retarded relative to the movement of the film. In its broader aspect the perforate master strip is in fact the controlled device for the stage effect producing devices and, therefore, the object of the invention is a means to operate a control device in synchronism with the movement of the film. In particular the object of the invention is to provide a means for operating a perforate master strip across a tracker board and means for controlling the movement thereof in synchronism with the movement of the film. These several objects and the particular novel features of construction are hereinafter more specifically set forth and claimed and shown in the accompanying drawings in which—

Figure 1:
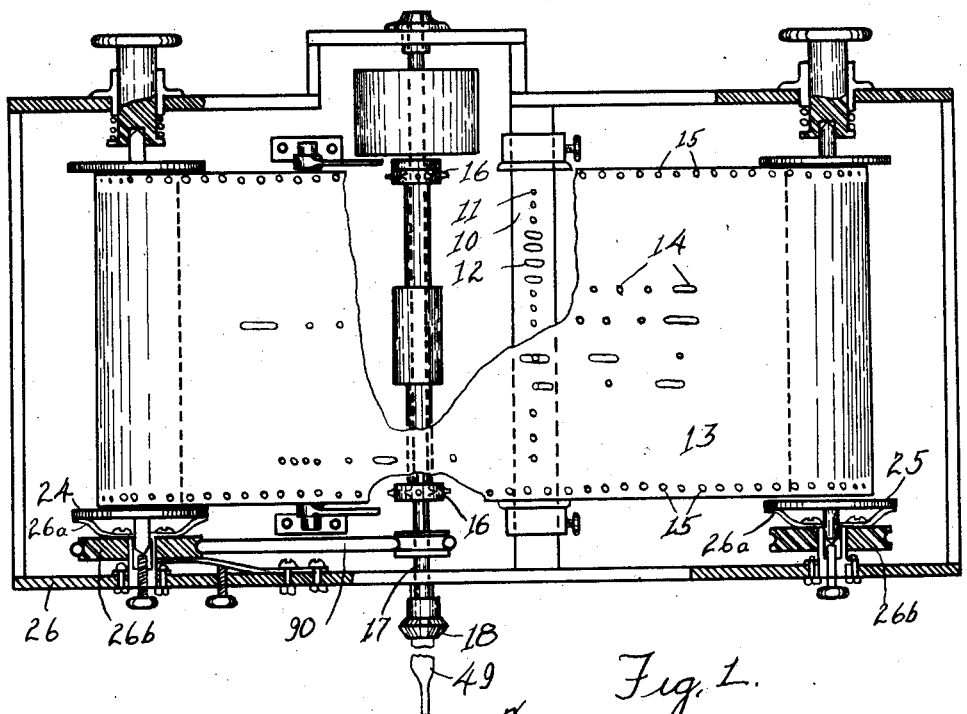
Figure 1 is a plan view of a control apparatus showing my synchronizing device in conjunction therewith.

As will be understood from the specification of the said former application Serial No. 113,397, the various effect producing devices are pneumatically controlled by means of a master strip 13 having perforations 14 in the body thereof adapted to register with the channels 11 and 12 in the tracker board 10, which channels communicate by means of tubes with the effect producing devices and opening of a channel 11 or 12 to atmosphere through the perforations 14 of the master strip produces operation of the effect producing device. The strip 13 has a series of equidistantly spaced perforations 15 adjacent each longitudinal edge thereof which are engaged by the toothed wheels 16 which are operated as herein shown by means of a shaft 17 extending beneath the strip as will be understood from Fig. 1. This shaft is provided with a bevel gear 18 or other means by which it may be directly connected with a shaft of the moving picture apparatus so that the shaft is operated at a definite speed relative to the speed of the film through the picture machine depending upon the ratio of the gears employed. The speed movement of the perforate strip is preferably much slower than that of the speed of movement of the film, the desired relation being that the perforations 14 uncover predetermined channels 11 of the tracker board at the time required for operation of the effect producing device connected with the channel opened and to correspond with the action of the scene displayed.

The perforate strip is carried on rollers 24 and 25 mounted at opposite ends of the case 26 and each roll is yieldingly retarded in its revolution by means of the flat contact springs 26ª engaging against the ends of the rollers as shown. These springs are preferably mounted on a pulley 26ᵇ in each instance and these pulleys may be directly driven by an electric motor or by a belt 90 from a pulley on the shaft 17, the purpose of which is to take up slack in the strip. It is to be noted that the toothed wheels 16 are carried loosely on the shaft and are utilized to control the speed of movement of the strip in order that the perforations 14 may be moved in exact synchronism with the movement of the film through the projecting apparatus. It is evident by reason of expansion or contraction of the strip and lack of accuracy in the driving mechanism, that it is possible the strip may not run in exact synchronism with the movement of the film, and I have provided a means shown more particularly in Figs. 2 and 3 to advance or retard movement of the perforate strip relative to the movement of the film so that the effect producing devices, controlled by registration of the apertures 14 of the strip with the channels of the tracker board, may be operated at the time the companion scene is displayed by the film.

To accomplish this the toothed wheels 16 are mounted on a common hollow shaft 40 through which the drive shaft 17 extends. On the outer end of the shaft is carried a gear 42 meshing with an internal gear 43 on the toothed wheel 16. This gear 42 is on a shaft 44, and also on this shaft is a worm wheel 45 meshing with a worm 46 on the shaft of the setting wheel 47. These several shafts and gears are carried in a casting secured to the shaft 17 constituting what I term the controller 41. The gear group is inclosed within a case 48 which is slidably mounted on one side of the case 26 as shown in Fig. 1. The case rides in ways as is shown particularly in Figs. 2 and 3 and may be moved by means of a bar 49 secured to the base of the case 48, and this bar may be operated directly or attached to any convenient means for operating the same.

Figure 2:
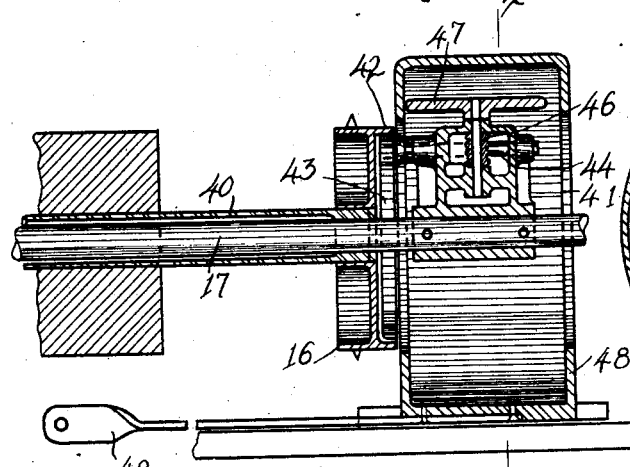
Fig. 2 is a longitudinal section of the synchronizing device.
Figure 3:
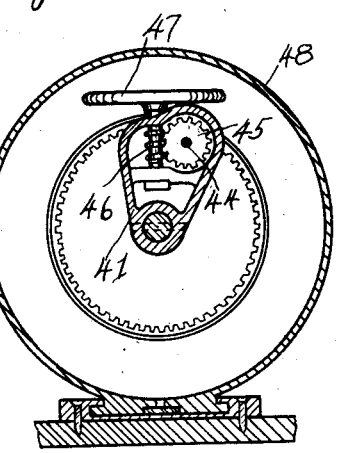
Fig. 3 is a section taken on line *x—x* of Fig. 2.

As will be understood from Fig. 2, if the case be moved in one direction or the other in its ways the face of the wheel 47 is brought into frictional contact with one side or the other thereof, and the toothed wheels 16 are made to rotate either slower or faster than the shaft 17 depending upon which side of the case is contacted by the wheel 47. When the case is in neutral position with the wheel 47 out of contact therewith, the toothed wheels 16 are rotated at the same speed as the drive shaft 17, and when the wheel 47 is in contact with the side of the case the wheels 16 will rotate either slower or faster than the shaft 17 causing an advance or retard in movement of the strip. The movement of the strip across the tracker board is independent of the pulley 26$^b$ which merely keeps the strip taut. This is possible by reason of the fact that the rolls frictionally engage the pulleys by means of the springs 26$^a$ which would allow movement of the rolls independently of the pulleys. It is thus evident that, by means of the wheel 47 and the train of gearing connecting the same with the two wheels 16, the perforate master strip may be so moved across the tracker board that the apertures 14 are brought into registration with the respective channels of the tracker board at the time intervals required by the scene displayed by the film and the movement of the master strip is thus synchronized with the movement of the film through the picture machine.

What I claim and desire to secure by Letters Patent of the United States is—

1. In combination with a driven shaft, a member rotatable on the shaft, a member rotatable with the shaft, the two members being in geared relation, a friction wheel carried by the second member through rotation of which the two members are caused to rotate at different speeds, means for causing the friction wheel to turn in one direction or the other during rotation of the driven shaft to advance or retard the speed of rotation of the first member relative to the second member.

2. In combination with a driven shaft, a member rotatable with the shaft, a member rotatable on the shaft and in geared relation with the member rotatable with the shaft, a wheel constituting part of the first named member through rotation of which the speed of rotation of the second member relative to the first member may be varied, and a manually operated means brought into engagement with the said wheel upon one side or the other at will to cause rotation thereof in one direction or the other and thereby advance or retard the speed of rotation of the second member.

3. The combination with a driven shaft, of a power transmission member rotatable therewith, a second member including a toothed wheel rotatable relative to the shaft and in geared relation with the first named member, a friction wheel carried by the first named member through rotation of which the toothed wheel may be varied in speed of rotation, the said geared relationship of the toothed wheel and said power transmission member normally causing the same to rotate in unison, and a non-revoluble member of a character adapted to be brought into engagement with the friction wheel upon one side or the other at will whereby said transmission member, by reason of its rotation, rotates the friction wheel and advances or retards the speed of revolution of the toothed wheel relative to that of the shaft.

4. In combination with a drive shaft, a member rotatable on the shaft, a gear group, a support for the group attached to the shaft, the gear group having a gear thereof in geared relation with said member, a friction wheel for actuating the gear group, and means for turning the friction wheel to rotate in either direction and advance or retard said member relative to the shaft.

In testimony whereof, I sign this specification.

FRANK R. SOMMERMEYER.